Jan. 6, 1959 A. HORN ET AL 2,867,689
TELEPHONE PAY STATION COMPRISING COIN COUNTING DEVICE FOR DIFFERENT CALL RATES
Filed April 25, 1955 2 Sheets-Sheet 1
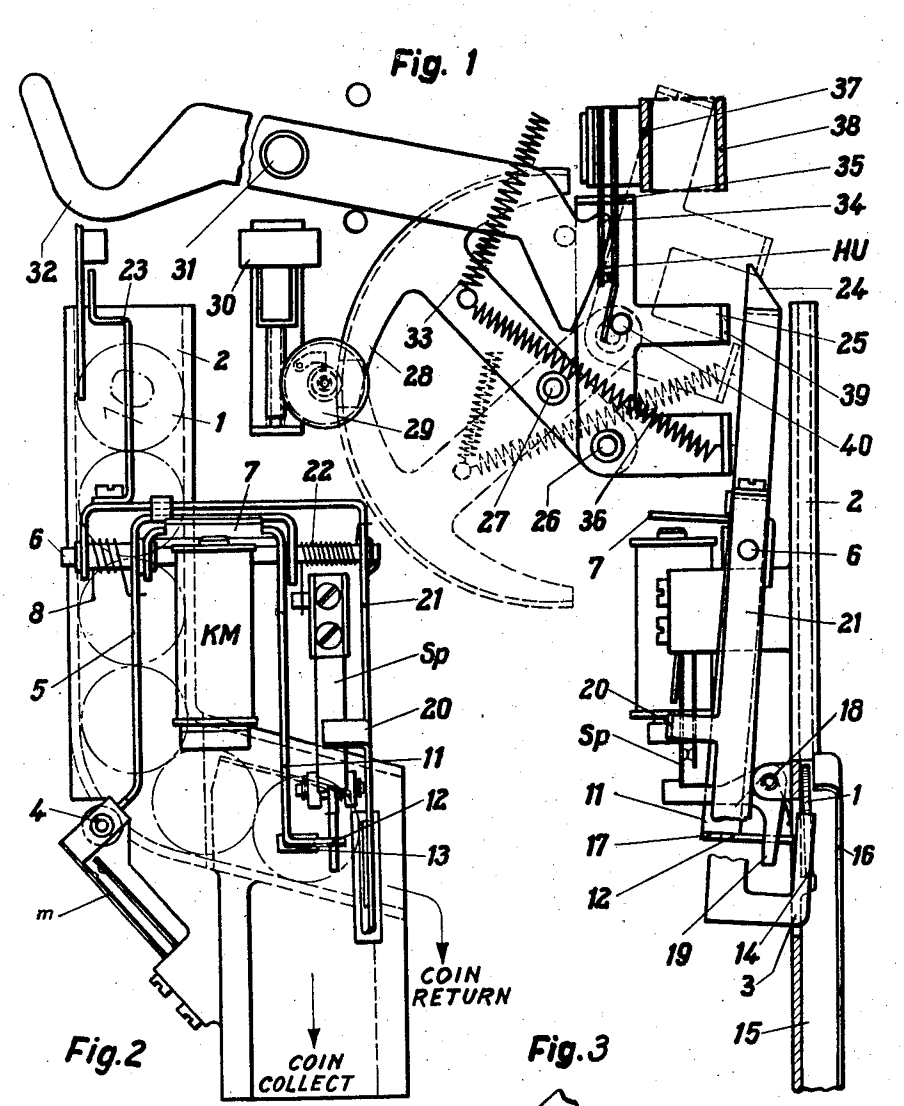
Fig. 1 Fig.2 Fig.3
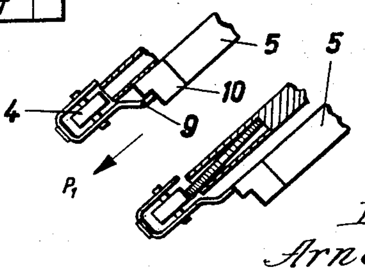
Inventors.
Arno Horn, &
Heinrich Langner.
By. [signature] Atty.

Jan. 6, 1959 A. HORN ET AL 2,867,689

TELEPHONE PAY STATION COMPRISING COIN COUNTING DEVICE FOR DIFFERENT CALL RATES

Filed April 25, 1955 2 Sheets-Sheet 2

Inventors.
Arno Horn, &
Heinrich Langner.
By [signature] Atty.

United States Patent Office 2,867,689

Patented Jan. 6, 1959

2,867,689

TELEPHONE PAY STATION COMPRISING COIN COUNTING DEVICE FOR DIFFERENT CALL RATES

Arno Horn and Heinrich Langner, Munich, Germany, assignors to Siemens & Halske Aktiengesellschaft, Munich, Germany, a corporation of Germany Application April 25, 1955, Serial No. 503,551
In Germany January 28, 1950

Public Law 619, August 23, 1954
Patent expires January 28, 1970

9 Claims. (Cl. 179—6.3)

This invention relates to a telephone pay station comprising a coin counting device for calls of different rate values, and particularly to pay station in which preparatorily deposited coins are successively collected by an exchange-controlled collect magnet up to an amount corresponding to the rate of a completed call.

Pay stations of the above noted general type comprising a coin counting device for calls of different rates such as they occur in a network traffic, for example, in automatic toll traffic, are described in German Patents No. 693,774, No. 697,899 and No. 709,627. Depending upon the rate to be charged for a call, a corresponding number of metering impulses is transmitted from the exchange for the actuation of the call meter involved, such impulses being utilized for controlling the collect magnet in the pay station. The meter may in some cases be actuated according to the distance between the interconnected subscribers and also in accordance with the duration of the corresponding call. It is, accordingly, for the determination of the call rate necessary to multiply the time- and distance-factors at the conclusion of a call and to express the corresponding results in terms of meter impulses. In order to simplify the device for the rate determination, it would be possible to limit the duration of calls to predetermined time intervals, in which case a short call would be charged at a rate corresponding to the full time interval allowed.

However, a simple rate determining device will be obtained without detriment to the call time limitation by transmitting metering impulses during the call in spaced intervals corresponding to the call rate. This so-called time-impulse metering has the advantage that calls may be prolonged desired. If this advantage is to be utilized for pay stations, it will be necessary to collect with each metering impulse a coin amount in keeping with the corresponding call time unit.

The coin deposit chute holding the preparatorily inserted coins in stored position is thereby successively emptied so that additional coins can be deposited. The collection of the coins at the conclusion of a call would require provision of a storage deposit chute large enough to hold a number of coins in an amount corresponding to the most expensive call possible.

Known pay stations with coin counting devices, as described in German Patent No. 697,899, require actuation of an armature, by the collect magnet, which releases with each collect operation always one coin while retaining the remaining coins in the storage deposit chute.

The invention eliminates the coin separating device requiring an armature operation which increases the cost of the coin collection apparatus. This is achieved by the invention by carrying out the required separation of the coin which is to be collected, from the coins contained in the storage deposit chute, by means of a lever displaced by the collect magnet, such lever projecting through a side wall of the chute and seizing the coin broadside, that is, along its side perpendicular to its advance motion for shifting it through an opening in the wall of the chute into a channel or chute leading to the coin collect receptacle. The coins remaining in the storage deposit chute can move along such chute only after the collect lever is retracted.

Coin collection according to predetermined rate units, prior to start of each call period, requires blocking of the call at times when the deposited coins are exhausted because the calling party could otherwise continue talking without paying.

The invention solves the resulting problem in simple manner by causing the lever which effects the collection of coins to actuate in the absence of a coin to be collected a call-blocking contact, such contact being after return of the lever into its initial position held in its operated position until the party either deposits further coins or hangs up.

It is known, in accordance with the German Patent No. 565,906, to release responsive to the attraction of the collect magnet a testing operation as to the presence of the amount to be collected, with the result, that the connection is instantly blocked if the required amount is absent. The invention eliminates the special coin feeler lever required in such structure, utilizing the collect lever for the corresponding purpose.

The control of the collect magnet takes place over the line conductors which are during a call traversed by direct current, by means of an alternating current collect impulse which is simultaneously transmitted over the line and ground. The collect magnet has in view of such control only a weak attractive force and such magnet is in accordance with the invention relieved of the pressure of the contact to be actuated responsive to absence of the coin to be collected, by preparing such contact by means actuated by manipulations of the calling party and holding the contact in prepared position by a pawl, requiring merely simple release of the pawl by the collect lever, so as to effect the contact operation.

In case of a pay station connected to an automatic telephone exchange, the calling party is compelled to deposit the required amount due to actuation of contact means which shunts the dial impulse contact and which is opened responsive to deposit of a coin. If the testing for the presence of a coin in the coin deposit chute is not effected by a coin feeler contact controlled by the dial but by a contact controlled by a coin, difficulties will appear in the present collection system because such a coin controlled contact disposed in the coin chute would hinder the advance of the successive coins.

This difficulty is in accordance with the invention overcome by disposing the coin controlled contact at a point in the coin deposit chute along which the coins pass with greatest speed thereby making available for the actuation of the contact not only the coin weight but also the momentum of the coin. Such contact is actuated only responsive to the passage of a coin, and the contact is accordingly formed so as to be actuated by the passage of the first coin and held in its actuated position until the party using the pay station replaces the receiver. This linking of the coin controlled contact also provides the advantage that the actuating element projecting into the coin deposit chute does not hinder the motion of the successively advancing coins once it has been actuated by the first coin.

The return of uncollected coins must be effected in known manner by an actuating element moved by the switch hook so as to avoid a special return magnet controlled from the exchange. It is in view of this operation and in consideration of the metering at the conclusion of local calls necessary to delay the coin return so that the collect magnet can be made effective prior to the actuation of the coin return. The control of the coin return by the switch hook, through the medium of a delay device, is broadly known and does not form part of the invention. The coin return is, however, connected with the invention to the extent that the element causing the coin return affects the blocking contact controlled by the collect lever responsive to the absence of a coin in the coin deposit chute.

The invention will now be explained with reference to the accompanying drawings showing in schematic manner only those parts of a pay station which are necessary for an understanding of the invention.

In these drawings,

Fig. 1 is a view of the coin collect and return device of a pay station;

Fig. 2 shows the device as seen from the right of Fig. 1;

Fig. 3 illustrates two positions of the coin controlled contact; and

Figure 4:
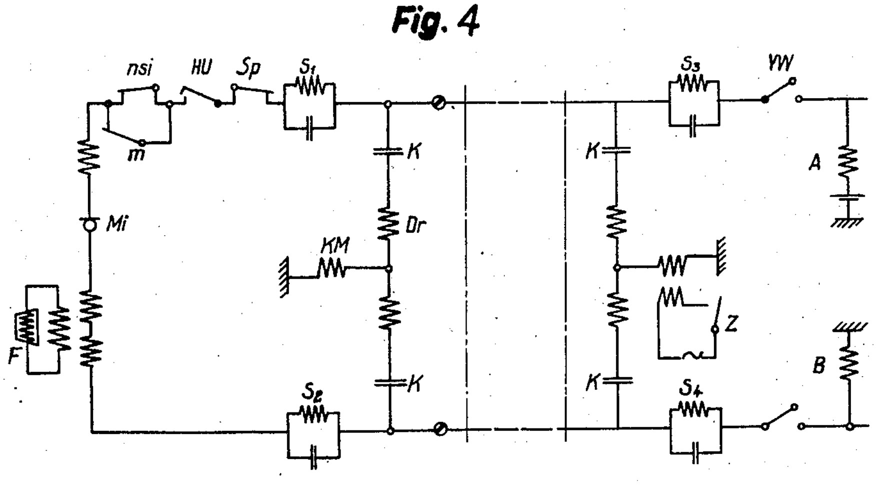
Fig. 4 shows a circuit for the pay station.

After running through the coin tester (not shown) the inserted coins 1 reach the coin storage deposit chute 2 and are stopped from further advance by the return stop at the discharge end thereof. The coin first inserted opens the coin insert contact *m*, thereby removing the shunt at the dial impulse contact *nsi*, shown in Fig. 3. The calling party can accordingly select the desired number after inserting a coin.

From Fig. 3 will be seen how the coins 1 pass the contact roller 4 which is journalled in a U-shaped bracket extending from a spring of the contact for interlinking coaction in its actuated position with the lever 5 outside the coin deposit chute, thus keeping the contact *m* open. The lever 5 is journalled upon the shaft 6 for the armature 7 of the collect magnet KM and is biased by a coiled spring 8. Therefore, as seen from Fig. 3, as soon as the roller 4 is moved in the direction of the arrow $P_1$, the stop 9 is removed from engagement with the stepped extension 10 of the lever 5 and such lever will rotate by the pressure of the spring 8 into the position in which it is shown at the bottom of Fig. 3.

A contact Z (Fig. 4) is closed in suitable manner (not shown), responsive to each metering impulse released in the exchange, and an alternating current impulse is transmitted over the line causing the collect magnet KM to attract its armature. The collect lever 11 (Figs. 1 and 2) is thereby tilted to move its extension 12 through an opening 13 in the side wall of the coin deposit chute. The lever 11 is incident to this operation tilted about the axis 6 and is returned to its initial position by the action of the armature restoring spring (not shown). The extension 12 of the collect lever 11 engages the coin 1 broadside and moves it past the angularly disposed bottom surface of the coin deposit chute 2 into the collect chute 15. The next advancing coin therefore engages the extension 12 and is held against further motion until such time when the collect lever returns into its initial position.

The armature stroke of the collect magnet and the length of the collect lever are such that the collect lever 11 tilts in the absence of a coin in the coin deposit chute to such extent that the extension 12 moves across the space of the collect chute 15 to the opposite chute wall 16. In the course of this tilting motion, the extension 17 of the lever 11 comes into engagement with the pawl 19 journalled upon the axis 18 so that the biased contact S*p* which is engaged by the pawl 19 is opened, and remaining open until it is again prepared by the extension 20 of the lever 21.

The lever 21 which effects the coin return is likewise pivotally journalled upon the axis 6 and is biased by spring 22. Fixedly connected with the lever 21 is a lever 23, the free end 24 of lever 23 projecting into the path of motion of lever 25 which is pivoted at 26 upon a toothed segment 28, the latter being in turn pivoted at 27. The toothed segment 28 is geared with the speed governor 30 over the worm 29.

The switch hook 32 which is pivoted about the axis 31, upon replacement of the receiver, moves the toothed segment 28 against the force of the spring 33, the segment thereby assuming the position in which it is shown in dotted lines. This operation is effected because the ear 34 of the switch hook engages the extension 35 of the lever 25, thereby lifting such lever. The tilting motion of the lever 25 into the dotted line position is effected by spring 36 which engages the toothed segment 28 and an extension of the lever 25. The path of motion of the lever 25 is determined by the surfaces formed by fixedly disposed guide members 37, 38, the lever 25 disengaging the switch hook shortly before reaching the terminal position and executing a motion independent of the switch hook with a speed which is determined by the governor 30, the toothed segment 28 returning from the dotted line position into the full line position by the force of the spring 33. The lever 25 which may be referred to as turnover lever, is thereby brought into engagement with the lever 24, through the medium of its extension 39, after an accurately predetermined time interval following replacement of the receiver, and causes for an accurately determined interval tilting displacement of the lever 24, so that the coins disposed within the coin storage deposit chute 2 can move into the return chute.

Upon termination of this interval, the discharge stop 3 will again enter the coin storage deposit chute and newly deposited coins will accordingly for the time being remain therein.

The pin 40 of the turnover lever 25 controls the switch hook contact HU.

In order to transmit the coin collect impulses while a call is in progress and without affecting the talking path over the line, alternating current is, as has been previously mentioned, transmitted simultaneously over both line conductors and ground. As will be seen from Fig. 4, there are provided capacitors K and chokes D*r* so as to maintain symmetric conditions. Blocking circuits S1, S2, and S3, S4, formed by chokes and capacitors, are provided so as to prevent leakage of the alternating current to the exchange equipment and to the pay station, respectively.

In Fig. 4, the microphone is indicated at M*i* and the receiver circuit at F. Characters VW indicate the line wipers of a preselector. The line or battery feed relays in the first group selector are indicated at A and B.

Changes may be made within the scope and spirit of the appended claims.

We claim:

1. A telephone pay station comprising a generally vertically extending coin storage deposit chute for receiving and storing a plurality of coins successively deposited therein at the upper end thereof, a coin collect chute and a coin return chute respectively disposed at the lower end of said coin storage chute and respectively extending therefrom, a pivotally mounted coin return lever having an extension normally projecting into said storage coin deposit chute through a first opening formed in a wall of said deposit chute at the lower end thereof to block discharge of deposited coins by engagement with the edge of the lowermost coin disposed in said deposit chute, a second opening formed in said wall of said deposit chute ahead of said first opening, a pivotally mounted collect lever having an extension facing said second opening, a coin collect magnet, exchange controlled circuit means for actuating said coin collect magnet, and means operated by said coin collect magnet for displacing said collect lever to move the extension thereof into said second opening for the purpose of engaging the lowermost coin in said deposit chute broadside to move such coin for discharge into said collect chute.

2. A telephone pay station according to claim 1, comprising a device for controlling the actuation of said coin return lever to cause discharge of uncollected coins reposing in said deposit chute into said coin return chute, said device comprising a time delay mechanism, means controlled by the switch hook responsive to replacement of the receiver at said pay station for starting operation of said time delay mechanism, and means controlled by said mechanism independent of said switch hook for displacing said coin return lever to withdraw the extension thereof from said first opening to permit discharge of said uncollected coins into said return chute.

3. A pay station according to claim 1, comprising blocking contact means actuated by said collect lever upon operation thereof in the absence of a coin to be collected thereby, circuit means controlled by said blocking contact means for blocking the corresponding call established from said pay station, and means controlled by the switch hook mechanism of said pay station for controlling said blocking contact means.

4. A pay station according to claim 3, comprising pawl means for preparing said blocking contact means for operation, said collect lever controlling said pawl means to cause actuation of said blocking contact means.

5. A pay station according to claim 3, comprising control means extending from said coin return lever for preparing the operation of said blocking contact, and a pawl for controlling said blocking contact means in its actuated position.

6. A pay station according to claim 1, comprising coin controlled contact means for governing the operative use of said pay station, said coin controlled contact means being disposed on said storage coin deposit chute and in part projecting thereinto at a point of said chute to secure its actuation by the weight and momentum of an inserted coin.

7. A pay station according to claim 6, comprising a roller mounted in a U-shaped bracket constituting said part projecting into said deposit chute, said bracket extending from a contact spring of said coin controlled contact means, interlock means for cooperation with said contact spring, and means coacting with said coin return lever for governing the operation of said interlock means.

8. A pay station according to claim 1, comprising coin controlled contact means for signalling the deposit of coins, control lever means for controlling said coin controlled contact means, an armature for said collect magnet and a pivot for said armature, said coin collect lever and said coin return lever and said control lever being journalled upon the pivot for said armature.

9. A pay station according to claim 1, comprising a call blocking contact controlled by said collect magnet for blocking further progress of a call in the absence of a coin to be collected therefor, a coin controlled coin deposit contact for signalling the deposit of a coin, and means for mounting said collect magnet and said blocking contact and said deposit contact on said storage coin deposit chute.

References Cited in the file of this patent

UNITED STATES PATENTS

| | | |
|---|---|---|
| 2,133,523 | Alexandersson et al. | Oct. 18, 1938 |
| 2,134,168 | Wright | Oct. 25, 1938 |
| 2,270,066 | Lomax | Jan. 13, 1942 |